United States Patent
Bedeau et al.

(10) Patent No.: US 9,925,839 B2
(45) Date of Patent: Mar. 27, 2018

(54) SUSPENSION BUMP STOP DEVICE WITH LATCHING MEANS

(71) Applicants: Charles Bedeau, Tours (FR); Christophe Houdayer, Semblancay (FR); Jean-Marc Soudée, Chambray-les-Tours (FR); Désiré Vidot, Ballan-Miré (FR)

(72) Inventors: Charles Bedeau, Tours (FR); Christophe Houdayer, Semblancay (FR); Jean-Marc Soudée, Chambray-les-Tours (FR); Désiré Vidot, Ballan-Miré (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/052,065

(22) Filed: Feb. 24, 2016

(65) Prior Publication Data

US 2016/0243915 A1    Aug. 25, 2016

(30) Foreign Application Priority Data

Feb. 25, 2015    (FR) .................................... 15 51620

(51) Int. Cl.

| B60G 15/06 | (2006.01) |
|---|---|
| F16C 19/10 | (2006.01) |
| F16C 33/76 | (2006.01) |
| F16C 35/06 | (2006.01) |
| F16C 33/78 | (2006.01) |

(52) U.S. Cl.
CPC ............ B60G 15/068 (2013.01); F16C 19/10 (2013.01); F16C 33/761 (2013.01); B60G 2204/128 (2013.01); B60G 2204/418 (2013.01); F16C 33/7886 (2013.01); F16C 35/06 (2013.01); F16C 2326/05 (2013.01)

(58) Field of Classification Search
CPC .... F16C 2326/05; F16C 19/10; F16C 33/761; F16C 33/7886; F16C 35/06; B60G 2204/418; B60G 2204/128; B60G 15/068
See application file for complete search history.

(56) References Cited

U.S. PATENT DOCUMENTS

| 4,948,272 A | * | 8/1990 | Stowe ................. | B60G 15/068 384/607 |
|---|---|---|---|---|
| 5,172,999 A | * | 12/1992 | Ijima .................... | B60G 15/063 267/122 |
| 6,257,605 B1 | * | 7/2001 | Zernickel ............. | B60G 15/063 267/220 |

(Continued)

FOREIGN PATENT DOCUMENTS

| DE | 102008005031 A1 | * | 7/2009 | ........... B60G 15/068 |
|---|---|---|---|---|
| DE | 102009059168 A1 | * | 6/2011 | ........... B60G 15/068 |

(Continued)

*Primary Examiner* — Alan B Waits
(74) *Attorney, Agent, or Firm* — Bryan Peckjian; SKF USA Inc. Patent Dept.

(57) ABSTRACT

A suspension bump stop device that provides an upper bearing cap that contacts an upper bearing seat outside of the device, and a lower support cap and at least one bearing arranged between the caps. The upper bearing cap provides a latching means that cooperates with the upper bearing seat to axial secure the bearing seat.

7 Claims, 3 Drawing Sheets

(56) References Cited

U.S. PATENT DOCUMENTS

| | | | | |
|---|---|---|---|---|
| 6,267,512 B1* | 7/2001 | Beghini | ............... | B60G 15/068 384/607 |
| 6,592,112 B2* | 7/2003 | Bishop | ................ | B60G 13/003 188/321.11 |
| 7,077,248 B2* | 7/2006 | Handke | ................ | B60G 15/068 188/321.11 |
| 8,066,435 B2* | 11/2011 | Miyata | ................ | B60G 15/068 280/124.147 |
| 8,308,176 B2* | 11/2012 | Lenon | ................ | B60G 15/068 267/220 |
| 8,474,846 B2* | 7/2013 | Dubus | ................ | B60G 15/068 188/321.11 |
| 8,496,383 B2* | 7/2013 | Viault | ................ | B60G 15/068 267/217 |
| 8,851,762 B2* | 10/2014 | Corbett | ................ | B60G 15/068 384/609 |
| 8,876,399 B2* | 11/2014 | Lutz | ........................ | F16C 19/10 384/607 |
| 2007/0267793 A1* | 11/2007 | Chamousset | ........ | B60G 15/068 267/220 |
| 2011/0221158 A1* | 9/2011 | Stautner | ............... | B60G 15/068 280/124.147 |
| 2013/0064489 A1* | 3/2013 | Corbett | ................ | B60G 15/068 384/607 |

FOREIGN PATENT DOCUMENTS

| | | | | |
|---|---|---|---|---|
| DE | 102009059168 A1 | | 6/2011 | |
| DE | 102012215912 A1 * | | 3/2014 | ............ F16C 33/761 |
| EP | 0480443 A2 * | | 4/1992 | ......... B60G 15/063 |
| EP | 0480443 A2 | | 4/1992 | |
| FR | 2679610 A1 | | 1/1993 | |
| FR | 2799693 A1 * | | 4/2001 | ............. B60G 11/16 |
| FR | 2865008 A1 * | | 7/2005 | ............. B60G 11/16 |
| FR | 2910383 A1 * | | 6/2008 | ......... B60G 15/068 |
| FR | 2975947 A1 * | | 12/2012 | ......... B60G 15/068 |

* cited by examiner

SUSPENSION BUMP STOP DEVICE WITH LATCHING MEANS

CROSS REFERENCE TO RELATED APPLICATION

This is a Non-Provisional Patent Application, filed under the Paris Convention, claiming the benefit of French (FR) Patent Application Number 1551620, filed on 25 Feb. 2015, which is incorporated herein by reference in its entirety.

TECHNICAL FIELD OF THE INVENTION

The present invention relates to the field of suspension bump stop devices used in particular for motor vehicles in the suspension struts of the steered wheels.

BACKGROUND OF THE INVENTION

Such a suspension bump stop device generally comprises a rolling bearing forming an axial thrust bearing and upper and lower caps forming a housing for the rings of the rolling bearing and providing the interface between the said rings and the neighbouring elements. Preferably, the rolling bearing is of the angular contact type in order to take up both the radial loads and the axial loads exerted on the device.

The bump stop device is generally arranged in the upper part of the suspension strut between a suspension spring and an upper bearing seat secured to the bodyshell of the vehicle. The suspension spring is mounted around a shock absorber piston rod the end of which is connected to the bodyshell of the vehicle. The suspension spring, of the helical spring type, bears axially, directly or indirectly, on the lower cap of the suspension bump stop device. The bump stop device makes it possible to transmit axial and radial loads between the suspension spring and the bodyshell of the vehicle while allowing a relative rotational movement between the lower cap and the upper bearing seat arising from a turn of the steering wheels of the vehicle and/or from the compression of the suspension spring.

Generally, the upper cap of the bump stop device comprises bosses on its outer surface which bear radially against the upper bearing seat. These bosses enable the bump stop device to be fitted and centred by radial contact with respect to the bearing seat.

Before the assembly formed by the bump stop device and the upper bearing seat is mounted in the strut of the vehicle, the radial frictional contact between the bosses of the upper cap and the bearing seat provides for relative axial retention of the said seat and the device.

However, during handling, transport and mounting of this assembly, there is a risk of the bump stop device and the upper bearing seat becoming detached.

The present invention aims to overcome this disadvantage.

BRIEF SUMMARY OF THE INVENTION

In one embodiment, the suspension bump stop device comprises an upper bearing cap able to come into contact with an upper bearing seat which is outside the device, a lower support cap and at least one bearing arranged between the said caps. The upper bearing cap comprises a latching means able to cooperate with the upper bearing seat for axial securement with the said bearing seat.

The unitary assembly formed by the suspension bump stop device and the upper bearing seat can thus be handled, transported and mounted without risk of the device and the seat becoming detached.

Preferably, the latching means of the upper bearing cap is made in one piece with a body of the said cap.

Advantageously, the latching means of the upper bearing cap comprises a lower radial stop surface able to come axially opposite an upper radial stop surface of the upper bearing seat.

The latching means of the upper bearing cap can be arranged on an outer surface of the body of the said cap or on a bore of the said body.

In one embodiment, the latching means of the upper bearing cap comprises a plurality of hooks spaced with respect to one another in the circumferential direction and extending radially from the body of the said cap. Alternatively, the latching means of the upper bearing cap can comprise a single annular hook extending radially from the said body. In another embodiment, the upper bearing cap comprises a plurality of tabs extending axially from the body of the said cap and provided with hooks extending radially and forming the latching means.

Preferably, the upper bearing cap additionally comprises bosses able to interfere radially with the upper bearing seat. Preferably, the upper bearing cap comprises an axial retaining means cooperating with a complementary axial retaining means of the lower support cap. The bosses and the axial retaining means are separate from the latching means of the bearing cap.

In one embodiment, the bearing is provided with a first ring and with a second ring. The upper bearing cap is mounted in contact with one of the rings and the lower support cap is mounted in contact with the other ring. The bearing can comprise at least one row of rolling elements arranged between the first and second rings.

The invention also relates to an assembly comprising a suspension bump stop device as defined above and an upper bearing seat. The said assembly can for example be integrated with the strut of a motor vehicle.

BRIEF DESCRIPTION OF THE SEVERAL VIEWS OF THE DRAWING

The present invention will be better understood on studying the detailed description of embodiments given by way of non-limiting examples and illustrated by the appended drawings, in which.

DETAILED DESCRIPTION OF THE INVENTION

Figure 1:
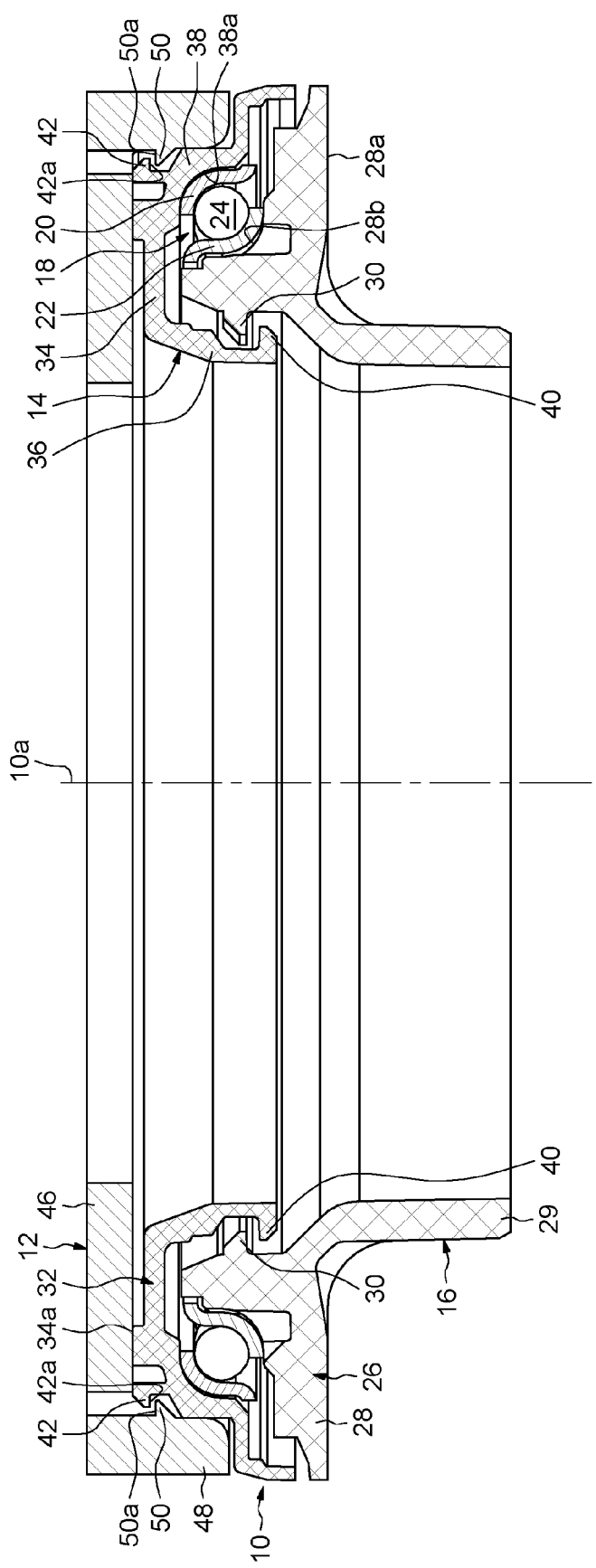
FIG. 1 is a view in axial section of a suspension bump stop device according to a first exemplary embodiment of the invention.

In FIG. 1, a suspension bump stop device, referenced 10 in its entirety, is intended to be mounted between an upper bearing seat 12 coming into contact with a motor vehicle chassis element and a suspension spring (not shown) of the helical type. In FIG. 1, the device 10 is represented in an assumed horizontal position.

The device 10, of axis 10*a*, comprises an upper bearing cap 14 bearing against the upper bearing seat 12, a lower support cap 16 forming a bearing means for the suspension spring, and a rolling bearing 18 arranged axially between the said caps and forming an axial thrust bearing. As will be described in more detail herein below, the upper bearing cap 14 comprises a means for axially securing the device 10 relative to the bearing seat 12.

The bearing 18, of axis 10*a*, comprises an upper ring 20 and a lower ring 22 between which there is housed a row of rolling elements 24, here taking the form of balls. A cage (not shown) is also provided to allow a regular circumferential spacing to be maintained between the rolling elements 24. The rolling elements 24 are arranged between ringways formed by the upper ring 20 and lower ring 22. Advantageously, these rings can be obtained from the same sheet metal blank by cutting and stamping.

The lower support cap 16, of axis 10*a*, is made in one piece by moulding a rigid synthetic material, for example polyamide. The synthetic material can be filled with glass fibres. The support cap 16 comprises an annular body 26 provided with an annular radial portion 28 in the form of flange and with an annular axial skirt 29 prolonging a small-diameter edge of the radial portion 28 and extending axially in the opposite direction to the upper bearing cap 14. The radial portion 28 comprises an annular lower radial surface 28*a* delimiting a bearing surface for the upper end turn of the suspension spring, and an upper toroidal surface 28*b* in contact with the lower ring 22 of the bearing and of complementary shape.

The lower support cap 16 further comprises a plurality of internal hooks 30 formed in the bore of the body 26 and extending radially inwards. The hooks 30 extend radially inwards in the direction of the upper bearing cap 14. In the exemplary embodiment illustrated, the hooks 30 are arranged in the vicinity of the upper end of the support cap 16. The hooks 30 are here spaced with respect to one another in the circumferential direction, preferably in a regular manner Alternatively, the support cap 16 may comprise one annular internal hook, i.e. one which is continuous in the circumferential direction.

The upper bearing cap 14, of axis 10*a*, is made in one piece by moulding a rigid synthetic material. The bearing cap 14 is provided with an annular body 32 comprising an annular radial portion 34 and an annular internal axial skirt 36 downwardly axially prolonging a small-diameter edge of the said radial portion and extending into the bore of the lower support cap 16. The radial portion 34 comprises an upper annular radial bearing surface 34*a* mounted axially in contact with the upper bearing seat 12. The body 32 also comprises an annular external axial skirt 38 downwardly axially prolonging a large-diameter edge of the radial portion 34 and radially surrounding the lower support cap 16. The axial skirt 38 here has a stepped shape. The axial skirt 38 delimits a lower toroidal surface 38*a* in contact with the upper ring 20 of the bearing and of complementary shape.

The upper bearing cap 14 comprises a plurality of internal hooks 40 formed on the internal skirt 36 and extending radially outwards. The hooks 40 extend from the outer surface of the internal skirt 36 radially outwards in the direction of the lower support cap 16. The hooks 40 are arranged axially below the hooks 30 of the lower support cap and have an outside diameter greater than the inside diameter of the hooks 30 so as to be able to interfere diametrically with the said hooks 30 in the event of a relative axial movement of the support cap 16 and the bearing cap 14. The internal hooks 40 of the upper bearing cap 14 form an axial retaining means cooperating with a complementary axial retaining means of the lower support cap 16 formed by the internal hooks 30.

In the exemplary embodiment illustrated, the hooks 40 are spaced with respect to one another in the circumferential direction, preferably in a regular manner Alternatively, the upper bearing cap 14 may comprise one annular internal hook, i.e. one which is continuous in the circumferential direction. In a variant, it would further be possible to provide one or more hooks formed in the bore of the external skirt 38 of the bearing cap 14, for example in the vicinity of its free lower end, and extending radially inwards and cooperating with one or more corresponding hooks provided on the outer surface of the body 26 of the lower support cap.

In order to axially secure the upper bearing cap 14 of the device with the bearing seat 12, the cap comprises a plurality of external hooks 42 extending radially outwards from the body 32. In the exemplary embodiment illustrated, the hooks 42 extend from the outer surface of the body 32, and more precisely from the outer surface of the radial portion 34. The hooks 42 extend radially outwards in the direction of the upper bearing seat 12 without radial contact between them.

Figure 2:
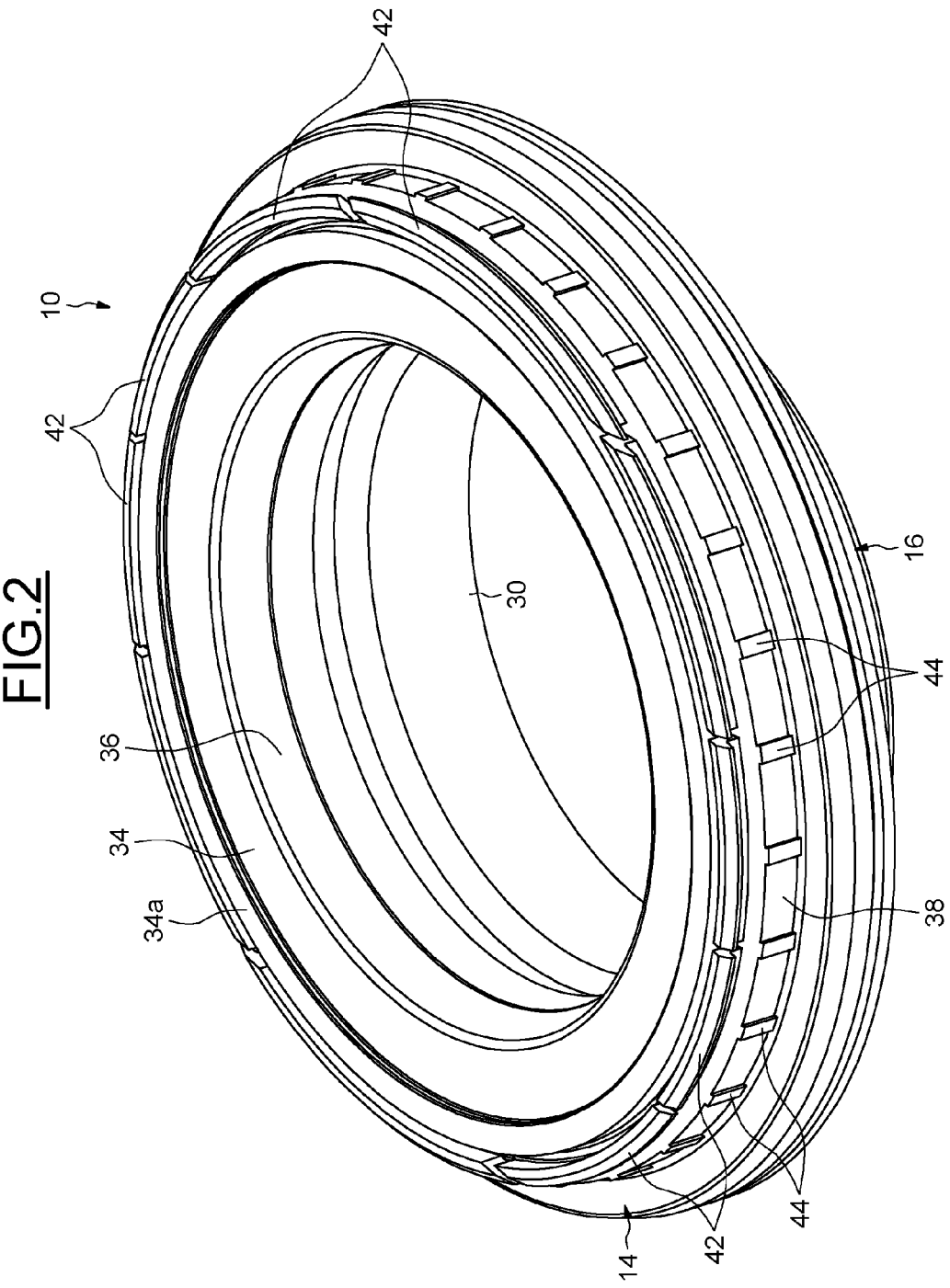
FIG. 2 is a perspective view of the bump stop device of FIG. 1.

As illustrated more clearly in FIG. 2, the hooks 42 are here spaced with respect to one another in the circumferential direction in a regular manner A slot (not referenced) of small dimension is provided between each pair of successive hooks 42. Alternatively, the upper bearing cap 14 may comprise one annular external hook, i.e. one which is continuous in the circumferential direction.

The upper bearing cap 14 further comprises a plurality of bosses 44 formed on the outer surface of the external axial skirt 38 and here spaced with respect to one another in the circumferential direction in a regular manner The bosses 44 come radially into contact with the upper bearing seat 12. In the exemplary embodiment illustrated, the bosses 44 are situated axially below the external hooks 42. The hooks 42 and the bosses 44 are made in one piece with the body 32 of the bearing cap.

Referring again to FIG. 1, the bearing seat 12 comprises an annular radial portion 46 axially bearing against the bearing surface 34*a* of the upper bearing cap, and an annular external axial skirt 48 axially downwardly prolonging a large-diameter edge of the radial portion 46 and partly radially surrounding the upper bearing cap 14. The skirt 48 is centred on the external axial skirt 38 of the bearing cap and interferes radially with the bosses 44 (FIG. 2) of the said cap. In a variant embodiment, the bosses of the bearing cap could be provided on the bore of the internal skirt 36 and come radially into contact with an internal skirt of the bearing seat 12.

The bearing seat 12 further comprises a plurality of internal hooks 50 formed in the bore of the skirt 48 and extending radially inwards. The hooks 50 extend radially inwards in the direction of the upper bearing cap 14 without radial contact between them. The hooks 50 are arranged axially below the hooks 42 of the upper bearing cap and have an inside diameter less than the outside diameter of the hooks 42 so as to be able to interfere diametrically with the said hooks 42 in the event of a relative axial movement of the bearing cap 14 and the bearing seat 12. Each hook 42 of the bearing cap comprises a lower radial stop surface 42*a* coming axially opposite an upper radial stop surface 50*a* of the associated hook 50 of the bearing seat. In the event of a relative axial movement of the bearing cap 14 and the bearing seat 12, axial retention of these two elements is achieved by axial contact between the hooks 50 and 42, and more precisely by axial contact between the stop surfaces 42a and 50a.

The external hooks 42 of the upper bearing cap 14 form a latching means cooperating with a complementary latching means of the bearing seat 12 formed by the internal hooks 50. In the exemplary embodiment illustrated, the hooks 50 of the bearing seat are spaced with respect to one another in the circumferential direction, preferably in a regular manner Alternatively, the upper bearing seat 12 may comprise one annular internal hook, i.e. one which is continuous in the circumferential direction.

The device 10 and the bearing seat 12 form a unitary assembly which can be stored, transported and then mounted in the strut of the vehicle with a low risk of axial detachment. Axial securement of the upper bearing cap 14 and the bearing seat 12 is effectively achieved by latching or hooking means which are made of a rigid material. The device 10 is mounted on the bearing seat 12 by a simple axial pushing operation without prior angular indexing.

In the exemplary embodiment illustrated, the hooks 42 of the upper bearing cap are arranged on the radial portion 34 of the said cap. In a variant, the hooks 42 may be provided in another region of the outer surface of the body 32 of the bearing cap, for example on the external skirt 38. In another variant embodiment, it is further possible to provide an upper bearing cap comprising an external skirt extending axially upwards and provided with external hooks extending radially inwards and cooperating with complementary hooks provided on the outer surface of the external skirt 48 of the bearing seat. Alternatively, it will further be possible to provide an upper bearing cap comprising internal hooks extending radially inwards from the bore of the body 32 and intended to cooperate with internal hooks of the bearing seat 12, for example provided on an internal axial skirt of the said seat.

Figure 3:
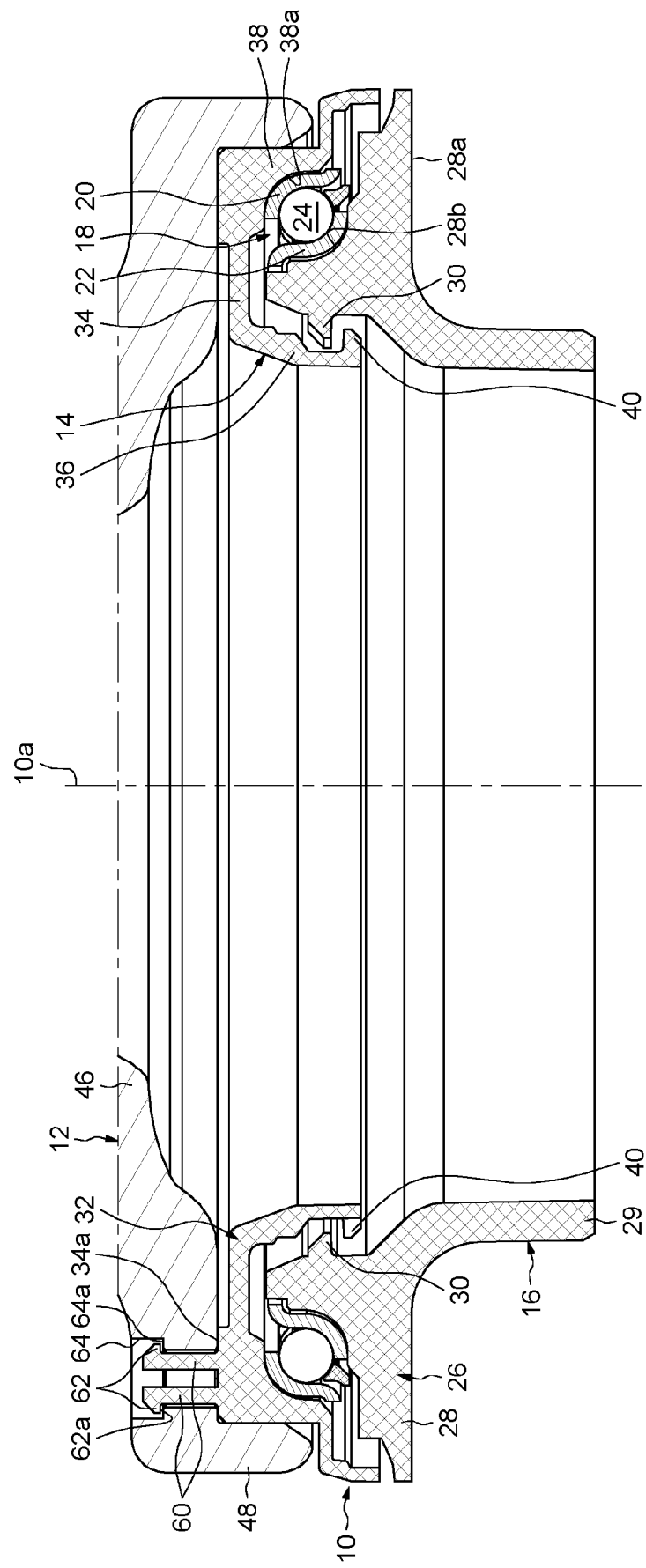
FIG. 3 is a view in axial section of a suspension bump stop device according to a second exemplary embodiment of the invention.

The exemplary embodiment illustrated in FIG. 3, in which identical elements bear the same references, differs from the first example in that the upper bearing cap 14 comprises a plurality of groups of tabs 60 extending axially from the upper bearing surface 34a of the said cap and each comprising a radially extending hook 62 at its free end. In the figure, a single group of tabs 60 can be seen. The bearing cap 14 may for example comprise three groups of tabs 60 spaced in a regular manner with respect to one another in the circumferential direction. It is possible to provide a different number of groups of tabs, for example one, two or four. In the exemplary embodiment illustrated, each group comprises two tabs 60. The tabs 60 and the hooks 62 are made in one piece with the body 32 of the bearing cap.

The tabs 60 of each group extend inside a throughaperture 64 formed within the thickness of the radial portion 46 of the bearing seat. The aperture 64 has a stepped shape and delimits an upper radial stop surface 64a coming axially opposite a lower radial stop surface 62a of each associated hook 62. In the event of a relative axial movement of the bearing cap 14 and the bearing seat 12, axial retention of these two elements is obtained by axial contact between the hooks 62 and the stop surface 64a of the associated aperture. The hooks 62 of the upper bearing cap 14 form a latching means cooperating with the bearing seat 12 to provide for their relative axial securement. In the exemplary embodiment illustrated, the tabs 60 extend from the upper bearing surface 34a of the bearing cap. In a variant, it would be possible to provide tabs extending from a radial surface of the external skirt 38 of the bearing cap.

By virtue of the invention there is made available a bump stop device comprising an upper bearing cap provided with a latching means able to interfere axially with the bearing seat in order to provide for relative axial retention of the said seat with the device.

The invention has been illustrated on the basis of a suspension bump stop device comprising a rolling bearing provided with a first ring, with a second ring and with at least one row of rolling elements arranged between the rings. In a variant, the bearing may be of the sliding bearing type and be formed by an annular body, for example made of thermoplastic material, and may comprise radial grooves which can be filled with lubricant. In another variant, the sliding bearing may comprise two ringways or rings sliding directly on one another.

The invention claimed is:

1. A suspension bump stop device comprising:
   a bearing seat having an annular radial portion and an outer axial skirt located at an outer radial end of the radial portion, a plurality of bearing seat bores extend through the annular radial portion and are located adjacent to the annular axial skirt, a plurality of bearing seat hooks extend radially inwardly from the annular axial skirt such that plurality of bearing seat hooks are axially aligned with the plurality of bearing seat bores;
   an upper bearing cap that contacts the bearing seat, the upper bearing cap having an internal axial skirt having a first axially extending radial skirt surface forming a radially innermost upper cap portion of the upper bearing cap,
   a lower support cap having an annular axial skirt having a second axially extending radial skirt surface forming a radially innermost lower cap surface of the lower support cap;
   at least one bearing arranged between the upper bearing cap and the lower support cap, and
   wherein the plurality of bearing seat hooks secures the bearing seat with the upper support cap.

2. The device according to claim 1, wherein the upper bearing cap comprises at least one external hook configured to engage at least one of the plurality of bearing seat hooks, the at least one external hook is made in one piece with a body of the upper support cap.

3. The device according to claim 1, wherein the upper bearing cap includes a first radial stop surface that is axially opposite to a second radial stop surface of the plurality of bearing seat hooks.

4. The device according to claim 1, wherein the upper bearing cap includes a plurality of external hooks spaced with respect to one another in the circumferential direction and extending radially from a body of the cap to engage the plurality of bearing seat hooks.

5. The device according to claim 1, wherein the upper bearing cap includes a single annular hook extending radially from a body of the cap to engage the plurality of bearing seat hooks.

6. The device according to claim 1, wherein the upper bearing cap includes bosses that radially interfere with the upper bearing seat.

7. The device according to claim 1, wherein the upper bearing cap includes an axial retaining means that cooperates with a complementary axial retaining means of the lower support cap.

* * * * *